United States Patent
Dutta et al.

(10) Patent No.: US 10,968,351 B2
(45) Date of Patent: Apr. 6, 2021

(54) THERMAL CONDUCTING SILICONE POLYMER COMPOSITION

(71) Applicant: Momentive Performance Materials Inc., Waterford, NY (US)

(72) Inventors: Pranabesh Dutta, Bangalore (IN); Vinu Krishnan Appukuttan, Bangalore (IN); Sandeep Naik, Bangalore (IN); Anubhav Saxena, Bangalore (IN)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 15/928,448

(22) Filed: Mar. 22, 2018

(65) Prior Publication Data
US 2019/0292367 A1    Sep. 26, 2019

(51) Int. Cl.
| | |
|---|---|
| C08L 83/04 | (2006.01) |
| C08L 71/12 | (2006.01) |
| C08L 65/02 | (2006.01) |
| C08K 3/22 | (2006.01) |
| C08K 3/28 | (2006.01) |
| C08K 7/16 | (2006.01) |
| C08K 9/06 | (2006.01) |
| C08L 83/14 | (2006.01) |
| C08G 77/52 | (2006.01) |
| C09J 183/14 | (2006.01) |
| C09D 183/14 | (2006.01) |
| B33Y 70/00 | (2020.01) |
| C08K 3/38 | (2006.01) |

(52) U.S. Cl.
CPC ............... *C08L 83/04* (2013.01); *B33Y 70/00* (2014.12); *C08G 77/52* (2013.01); *C08K 3/22* (2013.01); *C08K 3/28* (2013.01); *C08K 7/16* (2013.01); *C08K 9/06* (2013.01); *C08L 65/02* (2013.01); *C08L 71/12* (2013.01); *C08L 83/14* (2013.01); *C09D 183/14* (2013.01); *C09J 183/14* (2013.01); *C08K 2003/2227* (2013.01); *C08K 2003/385* (2013.01); *C08K 2201/001* (2013.01); *C08K 2201/005* (2013.01); *C08L 2203/02* (2013.01); *C08L 2203/16* (2013.01); *C08L 2203/202* (2013.01); *C08L 2203/204* (2013.01)

(58) Field of Classification Search
None
See application file for complete search history.

(56) References Cited

U.S. PATENT DOCUMENTS

| | | |
|---|---|---|
| 3,176,034 A | 3/1965 | Clark |
| 3,668,273 A | 6/1972 | Krantz |
| 4,180,515 A * | 12/1979 | Bargain .................. C07F 7/081 |
| | | 556/415 |
| 4,226,761 A | 10/1980 | Cooper et al. |
| 4,725,658 A | 2/1988 | Thayer et al. |
| 4,774,028 A | 9/1988 | Imai et al. |
| 4,814,392 A | 3/1989 | Shea et al. |
| 5,035,927 A | 7/1991 | Chen et al. |
| 5,204,438 A | 4/1993 | Snow et al. |
| 5,357,022 A | 10/1994 | Banach et al. |
| 5,380,527 A | 1/1995 | Legrow et al. |
| 5,596,048 A | 1/1997 | Blohm et al. |
| 5,916,952 A | 6/1999 | Romenesko et al. |
| 6,783,692 B2 | 8/2004 | Bhagwagar |
| 6,815,486 B2 | 11/2004 | Bhagwagar et al. |
| 6,869,642 B2 | 3/2005 | Freuler et al. |
| 7,074,490 B2 | 7/2006 | Feng et al. |
| 7,109,288 B2 | 9/2006 | Akatsuka et al. |
| 7,579,425 B2 | 8/2009 | Terry et al. |
| 8,921,507 B2 | 12/2014 | Yoshihara et al. |
| 9,209,104 B2 | 12/2015 | Nguyen et al. |
| 2003/0096919 A1 | 5/2003 | Ichinohe |
| 2004/0254275 A1 * | 12/2004 | Fukui ..................... C08L 83/04 |
| | | 524/261 |
| 2007/0051773 A1 | 3/2007 | Ruchert et al. |
| 2007/0149703 A1 | 6/2007 | Caprasse et al. |
| 2007/0149834 A1 | 6/2007 | Endo et al. |
| 2007/0208144 A1 | 9/2007 | Delsman et al. |

(Continued)

FOREIGN PATENT DOCUMENTS

| | | |
|---|---|---|
| CN | 102634212 | 8/2012 |
| CN | 103849356 | 6/2014 |

(Continued)

OTHER PUBLICATIONS

Shen et al., "Polyethylene nanofibers with very high thermal conductivities." Nature Nanotechnology, 2010, vol. 5 (4), pp. 251-255.

(Continued)

*Primary Examiner* — Katie L. Hammer

(74) *Attorney, Agent, or Firm* — Joseph Waters; McDonald Hopkins LLC

(57) ABSTRACT

Provided is a polymer of the formula:

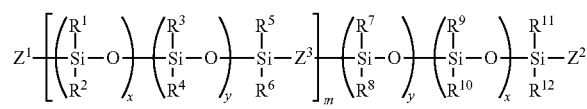

and compositions comprising the same. The polymers comprise a cyclic unsaturated group ($Z^3$) within the siloxane polymer backbone. The polymers have been found to exhibit good thermal conductivity and may find utility in a variety of applications.

35 Claims, No Drawings

(56) References Cited

U.S. PATENT DOCUMENTS

| | | | |
|---|---|---|---|
| 2008/0057325 A1* | 3/2008 | Sakurai | C09J 183/04 428/447 |
| 2008/0302064 A1 | 12/2008 | Rauch | |
| 2010/0276721 A1 | 11/2010 | Yoshitake et al. | |
| 2011/0272119 A1* | 11/2011 | Bhagwagar | C08L 83/04 165/104.11 |
| 2012/0322940 A1* | 12/2012 | Mueller | C08L 83/04 524/588 |
| 2018/0163113 A1 | 6/2018 | Uta et al. | |
| 2019/0144752 A1 | 5/2019 | Hannington et al. | |

FOREIGN PATENT DOCUMENTS

| | | |
|---|---|---|
| CN | 105018043 | 11/2015 |
| EP | 0163495 | 12/1985 |
| EP | 2562200 | 2/2013 |
| JP | 11323162 | 11/1999 |
| JP | 2007051221 | 3/2007 |
| JP | 2008214599 | 9/2008 |
| JP | 6125221 | 5/2017 |
| WO | 2015022998 | 2/2015 |
| WO | 2017213809 | 12/2017 |
| WO | 2017002489 | 3/2018 |

OTHER PUBLICATIONS

Singh et al., "High thermal conductivity of chain-oriented amorphous polythiophene." Nature Nanotechnology, 2014, vol. 9, pp. 384-390.

Patent Cooperation Treaty (PCT), International Search Report and Written Opinion for Application PCT/US2019/022232 filed Mar. 14, 2019, dated Jun. 24, 2019, International Searching Authority, EP.

* cited by examiner

THERMAL CONDUCTING SILICONE POLYMER COMPOSITION

FIELD

The present invention relates to a silicone polymer and compositions comprising the same. In particular, the present invention relates to a functionalized siloxane polymer comprising unsaturated cyclic moieties that exhibits good thermal stability and thermal conductivity.

BACKGROUND

As modern electronic devices are getting faster, smaller, and thinner, the application of advanced thermal conductive materials has become increasingly important at the interface of different heat generating components such as, for example, transistors, IC chip, engine control units, microprocessor, etc. Such materials enable highly dense and heavily integrated electronic devices to operate smoothly by dissipating heat to the atmosphere. In order to dissipate the heat effectively from the electronic components, various thermally conductive silicone compositions have been employed over the years. Most of these thermal conductive silicon compositions consist of organopolysiloxanes as a binder and heat conducting inorganic fillers. The problem associated with these materials is that they require a high concentration of inorganic fillers to improve the thermal conductivity of the overall composition because the organopolysiloxanes used in these compositions generally have low thermal conductivity. While a high loading of thermal conducting filler in the silicone composition increases the overall bulk thermal conductivity of the interface materials, a high filler loading often leads to problems such as lowering the fluidity of the composite, which leads to higher bond line thickness (BLT). Moreover, this low fluidity also affects the elastomeric property of the thermal interface materials as it increases the hardness of the silicone composite once it is cured, which deteriorates the moldability and long-term reliability of the interface materials.

SUMMARY

Provided is a thermally conducting silicone composition comprising an arylene ether functionalized organosiloxane polymer. The organosiloxane copolymer used in the silicone composition exhibited excellent dispersibility for both oxide and non-oxide thermal fillers enabling enhanced thermal conductivity of the compositions with improved mechanical property. Methods of making the modified silicone polymers and methods of making thermally conducting compositions are also disclosed.

In one aspect, provided is a composition comprising:
(A) a siloxane polymer, wherein the siloxane polymer (i) is of the formula:

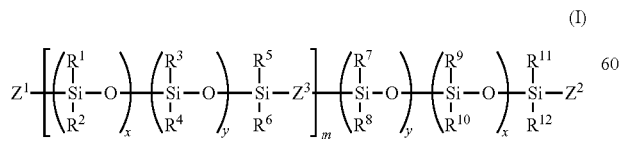

(I)

where $R^1$-$R^{12}$ are independently chosen from a hydrogen, a C1-C10 monovalent hydrocarbon group optionally containing a hetero atom, a C6-C20 monovalent aromatic group optionally containing a hetero atom, and a C4 to C30 monovalent saturated or unsaturated cycloalkyl group optionally containing a hetero atom, siloxy group containing 1-20 silicone atoms, $Z^1$ or $Z^2$;

$Z^1$ and $Z^2$ are independently chosen from a hydrogen, C1-C10 hydrocarbon group optionally containing heteroatom, —OH, —NH2, —COOH, or $R^{16}$-A-$R^{17}$— where A is chosen from a group comprising a unsaturated cyclic group chosen from a aromatic group, a functionalized aromatic group, a fused aromatic group optionally containing a heteroatom, a unsaturated alicyclic group, a unsaturated heterocyclic group, or a combination of two or more thereof; $R^{16}$ and $R^{17}$ are independently chosen from a nil, C1-C10 hydrocarbon group optionally containing a hetero atom, a C6-C20 aromatic group optionally containing a hetero atom, and a C4 to C30 saturated or unsaturated cycloalkyl group optionally containing a hetero atom, $Z^3$ is chosen from —$R^{19}$-A-$R^{19}$— where A is chosen from a group comprising a unsaturated cyclic moiety chosen from an aromatic group, a fused aromatic group, an unsaturated alicyclic group, an unsaturated heterocyclic group, or a combination of two or more thereof; and $R^{19}$ is chosen from a nil, C1-C10 hydrocarbon group optionally containing a hetero atom, a C6-C20 aromatic group optionally containing a hetero atom, and a C4 to C30 saturated or unsaturated cycloalkyl group optionally containing a hetero atom;

m is 1-100; x is 0-200; and y is 0-200 wherein x+y≥1; and (B) (i) a first filler, and (ii) a second filler, where at least one of the first filler and/or the second filler comprises a plurality of filler types differing from one another in terms of particle size and/or morphology.

In one embodiment, A is independently chosen from a C6 to C12 aromatic group; a C10-C36 fused aromatic ring group; a C4-C36 unsaturated alicyclic group; and a C4-C36 unsaturated heterocyclic group.

In one embodiment, A in one or more of Z1, Z2, and Z3 is chosen from a group of the formula -$A^1$-$R^{18}$-$A^2$- where $A^1$ and $A^2$ are independently chosen from a C6 to C12 aryl group, C12-C36 fused aromatic ring group, a C5-C36 unsaturated alicyclic group, and a C5-C36 unsaturated heterocyclic group; and $R^{18}$ is chosen from a direct bond —(CH$_2$)$_n$—, —C(CH$_3$)$_2$—, —O—, —S—, —S(O)$_2$—, —C(O)—, C(O)—NH—, —NH—C(O)—NH—, C(O)—O—, —CH=N—, or —CH=N—N=CH— where n is 1-10.

In one embodiment, A is independently chosen from

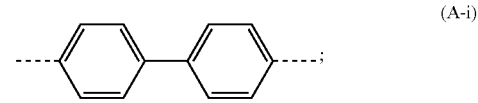

(A-i)

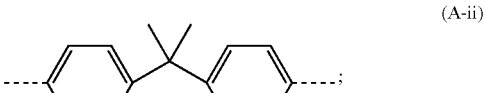

(A-ii)

(A-iii)

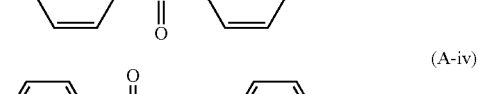

(A-iv)

(A-v)

(A-vi)

(A-vii)

(A-viii)

(A-ix)

(A-x)

(A-xi)

(A-xii) and (A-xiii)

In one embodiment, wherein A in $Z^1$, $Z^2$, and $Z^3$ is

In one emeobidmnet, A in $Z^1$, $Z^2$, and $Z^3$ is

In one embodiment of the composition of any previous embodiment, the siloxane polymer has number average molecular weight of from about 1000 g/mol to about 50000 g/mol.

In one embodiment of the composition of any previous embodiment, the first and second fillers are independently chosen from alumina, magnesia, ceria, hafnia, lanthanum oxide, neodymium oxide, samaria, praseodymium oxide, thoria, urania, yttria, zinc oxide, zirconia, silicon aluminum oxynitride, borosilicate glasses, barium titanate, silicon carbide, silica, boron carbide, titanium carbide, zirconium carbide, boron nitride, silicon nitride, aluminum nitride, titanium nitride, zirconium nitride, zirconium boride, titanium diboride, aluminum dodecaboride, barytes, barium sulfate, asbestos, barite, diatomite, feldspar, gypsum, hormite, kaolin, mica, nepheline syenite, perlite, phyrophyllite, smectite, talc, vermiculite, zeolite, calcite, calcium carbonate, wollastonite, calcium metasilicate, clay, aluminum silicate, talc, magnesium aluminum silicate, hydrated alumina, hydrated aluminum oxide, silica, silicon dioxide, titanium dioxide, glass fibers, glass flake, clays, exfoliated clays, or other high aspect ratio fibers, rods, or flakes, calcium carbonate, zinc oxide, magnesia, titania, calcium carbonate, talc, mica, wollastonite, alumina, aluminum nitride, graphite, graphene, aluminum powder, copper powder, bronze powder, brass powder, fibers or whiskers of carbon, graphite, silicon carbide, silicon nitride, alumina, aluminum nitride, zinc oxide, carbon nanotubes, boron nitride nanosheets, zinc oxide nanotubes, metal particles or a combination of two or more thereof. In one embodiment, metal particles are selected from aluminum, magnesium, zinc, iron, titanium, argentum, aurum, platinum, nickel, copper, tin, lead or combination thereof.

In one embodiment of the composition of any previous embodiment, the filler material has a particle size of from about 0.01 μm to about 500 μm.

In one embodiment of the composition of any previous embodiment, the filler material is chosen from a plurality of filler materials.

In one embodiment of the composition of any previous embodiment, the filler material is chosen from a first filler having an average particle size from about 0.01 to about 0.1 μm; a second filler having an average particle size of about 1 μm to about 25 μm; and optionally a third filler having an average particle size of about 50 μm to about 100 μm.

In one embodiment of the composition of any previous embodiment, the first, second, and third fillers are alumina.

In one embodiment of the composition of any previous embodiment, the composition comprises about 10 vol. % to about 90 vol. % of the first filler and about 90 vol. % to about 10 vol. % of the second filler.

In one embodiment of the composition of any previous embodiment, the fillers are treated with a surface functionalizing agent. In one embodiment, the surface functionalizing agent is chosen from an functionalized siloxane, alkoxy silane, an alkacryloxy silane, a vinyl silane, a halo silane (e.g., a chlorosilane), a mercapto silane, a blocked mercaptosilane, a thiocarboxylate silane, titanate salts, zirconate salts, Sorbitan stearate, or a combination of two or more thereof.

In one embodiment of the composition of any previous embodiment, the composition comprises a first filler and a second filler, wherein the first and second filler are independently chosen from a metal oxide filler and a non-oxide filler. In one embodiment, the non-oxide filler is chosen from a metal boride, a metal carbide, a metal nitride, a metal silicide, carbon black, graphite, expanded graphite, carbon fiber, or graphite fiber or a combination of two or more thereof.

In one embodiment of the composition of any previous embodiment, the first and second fillers are independently chosen from alumina, magnesia, ceria, hafnia, lanthanum oxide, neodymium oxide, samaria, praseodymium oxide, thoria, urania, yttria, zinc oxide, zirconia, silicon aluminum oxynitride, borosilicate glasses, barium titanate, silicon carbide, silica, boron carbide, titanium carbide, zirconium carbide, boron nitride, silicon nitride, aluminum nitride, titanium nitride, zirconium nitride, zirconium boride, titanium diboride, aluminum dodecaboride, barytes, barium sulfate, asbestos, barite, diatomite, feldspar, gypsum, hormite, kaolin, mica, nepheline syenite, perlite, phyropyhllite, smectite, talc, vermiculite, zeolite, calcite, calcium carbonate, wollastonite, calcium metasilicate, clay, aluminum silicate, talc, magnesium aluminum silicate, hydrated alumina, hydrated aluminum oxide, silica, silicon dioxide, titanium dioxide, glass fibers, glass flake, clays, exfoliated clays, or other high aspect ratio fibers, rods, or flakes, calcium carbonate, zinc oxide, magnesia, titania, calcium carbonate, talc, mica, wollastonite, alumina, aluminum nitride, graphite, aluminum powder, copper powder, bronze powder, brass powder, fibers or whiskers of carbon, graphite, silicon carbide, silicon nitride, alumina, aluminum nitride, zinc oxide, carbon nanotubes, boron nitride nanosheets, zinc oxide nanotubes, or a combination of two or more thereof.

In one embodiment of the composition of any previous embodiment, the filler comprises (i) a first filler, and (ii) a second filler, where at least one of the first filler and/or the second filler comprises a plurality of filler types differing from one another in terms of particle size and/or morphology. the first and second filler are independently chosen from a metal oxide filler and a non-oxide filler. In one embodiment, the non-oxide filler is chosen from a metal boride, a metal carbide, a metal nitride, a metal silicide, carbon black, graphite, expanded graphite, carbon fiber, or graphite fiber or a combination of two or more thereof.

In one embodiment, the plurality of filler types independently have an average particle size of from about 0.3 micron to about 350 micron, the plurality of filler types having average particle sizes different from one another.

In one embodiment, the plurality of filler types have a morphology different from one another, the morphology being chosen from spherical, platelet, agglomerates, spherical agglomerates and graphitic.

In one embodiment, the first filler is chosen from aluminum oxide, and the second filler is chosen from boron nitride. In one embodiment, the aluminum oxide comprises a plurality of filler types. In one embodiment, the plurality of filler types have an average particle size different from one another. In one embodiment, the plurality of filler types have a morphology different from one another. In one embodiment, the aluminum oxide and the boron nitride each comprise the plurality of filler type.

In one embodiment of the composition of any previous embodiment, the composition further comprises (i) an organopolysiloxane comprising at least one alkenyl functional group; and/or (ii) an organopolysiloxane comprising at least one Si—H group.

In one embodiment of the composition of any previous embodiment, the composition comprises an addition catalyst, a condensation curing catalyst, an inhibitor, an adhesion promoter, a crosslinker, a diluent, a thermal stabilizer, or a combination of two or more thereof.

In one embodiment of the composition of any previous embodiment, the composition is in the form of a thermal grease, adhesive, thermal gel, potting material, or a gap filler material.

In another aspect, provided is an article comprising the composition of any previous embodiment disposed on at least a portion of a surface of the article.

In one embodiment, the article comprises multiple layers, and the composition is disposed on a surface in between at least two of the layers.

In one embodiment of the article of any previous embodiment, the article is an electronic article, an automotive article, a home appliance article, smart appliance article, a telecommunication article, a healthcare article, a personal care article, an agricultural article, a molded article, a masonry surface, a textile material, a home care material.

In one embodiment of the article of any previous embodiment, the article comprises light emitting devices, computer devices, a stacked die, mobile phones, tablets, flip chip package, hybrid memory cube, touch screens, Wi-Fi device, automotive technology hifi systems, a through-silicon via device, and audio systems, in joints between heat pipes and water tanks in solar heated heating, in fuel cells and wind turbines, in the manufacture of computer chips, gaming consoles, data transfer devices, in light devices, batteries, in housings, coolers, heat exchanging devices, wires, cables, heating wires, refrigerators, dishwashers, air conditionings, accumulators, transformers, lasers, functional clothing, car seats, medical devices, fire protection, electric motors, planes, and trains, as a filament for 3D printing material, drug delivery systems, transdermal patches, wound healing patches, wound dressing patches, patches for scar reduction, transdermal iontophoresis, scaffold for tissue engineering, anti-microbial devices, wound management devices, ophthalmic devices, bioinserts, prostheses, body implants, paint, structural coating, masonry coating, or marine coating, seed coating, superspreader or controlled release fertilizer.

Also provided is a method of applying the composition of any previous embodiment to an article of any previous embodiment, which comprises dispensing under pressure or stencil printing or screen printing or jet printing or 3D printing, In one embodiment, thickness of the said composition is from 0.01 mm to 15 cm.

In still another aspect, provided is a personal care product comprising the composition of any previous embodiment.

In one embodiment, the personal care composition is in the form of an antiperspirant/deodorant, a shaving product, a skin lotion, a moisturizer, a toner, a bath product, a cleansing product, a shampoo, a conditioner, a combined shampoo/conditioners, a mousse, a styling gel, a hair spray, a hair dye, a hair color product, a hair bleach, a waving products, a hair straightener, a nail polish, a nail polish remover, a nail cream or lotions, a cuticle softener, a sunscreen, an insect repellent, an anti-aging product, a lipstick, a foundation, a face powder, an eye liner, an eye shadow, a blush, a makeup, a mascara, a moisturizing preparation, a foundation, a body and hand preparation, a skin care preparation, a face and neck preparation, a tonic, a dressing, a hair grooming aid, an aerosol fixative, a fragrance preparation, an aftershave, a make-up preparation, a soft focus application, a night and day skin care preparation, a non-coloring hair preparation, a tanning preparation, a synthetic and non-synthetic soap bar, a hand liquid, a nose strip, a non-woven application for personal care, a baby lotion, a baby shampoo, a baby conditioner, a shaving preparation, a cucumber slices, a skin pads, a make-up remover, a facial cleansing product, a cold cream, a sunscreen product, a spritzer, a paste mask and mud, a face mask, a cologne and toilet water, a hair cuticle coat, a shower gel, a face and body wash, a personal care rinse-off products, a gel, a foam bath, a scrubbing cleanser, an astringent, a nail conditioner, an eye shadow stick, a powder for face or eye, a lip balm, a lip gloss, a hair care pump spray, a hair-frizz-control gel, a hair leave-in conditioner, a hair pomade, a hair de-tangling product, a hair fixative, a hair bleach product, a skin lotion, a pre-shave and pre-electric shave, an anhydrous cream and lotion, an oil/water emulsion, a water/oil emulsion, a water-resistant cream or lotion, an anti-acne preparation, a mouth-wash, a massage oil, a toothpaste, a clear gel or stick, an ointment base, a topical wound-healing product, an aerosol talc, a barrier spray, a vitamin and anti-aging preparation, an herbal-extract preparation, a bath salt, a bath and body milk, a hair styling aid, a hair-, eye-, nail- and skin-soft solid application, a controlled-release personal care product, a hair conditioning mist, a skin care moisturizing mist, a skin wipe, a pore skin wipe, a pore cleaner, a blemish reducer, a skin exfoliator, a skin desquamation enhancer, a skin towelette or cloth, a depilatory preparation, or a personal care lubricant.

DETAILED DESCRIPTION

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Provided is a functionalized silicone polymer and compositions comprising the same. In particular, provided is a functionalized siloxane polymer. The functionalized siloxane polymer is a (AB)n-type siloxane polymer comprising organic groups within the siloxane chain. The siloxane polymer comprises organic groups comprising unsaturated cyclic moieties. The present siloxane polymers have been found to exhibit good thermal stability and thermal conductivity at relatively low filler concentrations.

Provided is a composition comprising (i) a silicone polymer, and (ii) a filler material, wherein the silicone polymer has the formula:

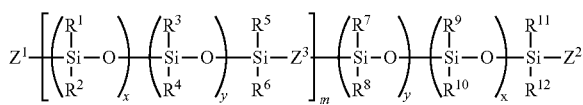

where $R^1$-$R^{12}$ are independently chosen from a hydrogen, a C1-C10 monovalent hydrocarbon group optionally containing a hetero atom, a C6-C20 monovalent aromatic group optionally containing a hetero atom, and a C4 to C30 monovalent saturated or unsaturated cycloalkyl group optionally containing a hetero atom, siloxy group containg 1-20 silicone atoms, $Z^1$ or $Z^2$;

$Z^1$ and $Z^2$ are independently chosen from a hydrogen, C1-C10 hydrocarbon group optionally containing heteroatom, —OH, —NH2, —COOH, or $R^{16}$-A-$R^{17}$— where A is chosen from a group comprising a unsaturated cyclic group chosen from a aromatic group, a fused aromatic group, a unsaturated alicyclic group, a unsaturated heterocyclic group, or a combination of two or more thereof; $R^{16}$ and $R^{17}$ are independently chosen from a nil, C1-C10 hydrocarbon group optionally containing a hetero atom, a C6-C20 aromatic group optionally containing a hetero atom, and a C4 to C30 saturated or unsaturated cycloalkyl group optionally containing a hetero atom;

$Z^3$ is chosen from —$R^{19}$-A-$R^{19}$— where A is chosen from a group comprising a unsaturated cyclic moiety chosen from an aromatic group, a fused aromatic group, an unsaturated alicyclic group, an unsaturated heterocyclic group, or a combination of two or more thereof; and $R^{19}$ is chosen from a nil, C1-C10 hydrocarbon group optionally containing a hetero atom, a C6-C20 aromatic group optionally containing a hetero atom, and a C4 to C30 saturated or unsaturated cycloalkyl group optionally containing a hetero atom; m is 1-100; x is 0-200; and y is 0-200.

As used herein, an unsaturated alicyclic group refers to an aliphatic cyclic group comprising one or more unsaturated bonds. In embodiments, the unsaturated alicyclic group comprises at least one C=C bond. In embodiments, the unsaturated alicyclic group is chosen from a C4-C36 alicyclic group comprising one or more C=C bonds. The unsaturated alicyclic group may comprise a single ring, a fused ring system, or a bicyclic ring system. Non-limiting examples of unsaturated alicyclic compounds include, but are not limited to, cyclopentene, cyclohexene, cyclopentadiene, dicyclopentadiene, etc.

As used herein, an unsaturated heterocyclic group refers to a cyclic group comprising at least one unsaturated bond and at least one heteroatom within the ring structure. The unsaturated group may be a C=C or an unsaturated bond between a carbon atom and a heteroatom.

In embodiments, the siloxane polymer comprises a curable functional group. In such embodiments, the siloxane comprises at least one $Z^1$ or $Z^2$ group with a curable functional group such as an allyl, vinyl, allyloxy, vinyloxy, acrylate, methacrylate, etc. In one embodiment, $R^{16}$ in the $Z^1$ or $Z^2$ group is chosen from $CH_2$=$CH_2$—$(CH_2)_a$—, $CH_2$=$CH_2$—$(CH_2)_a$—O—, $CH_2$=$CH_2$—$(CH_2)_a$—C(O)—O—, where a is 0-10. In one embodiment, $R^{16}$ is $CH_2$=$CH_2$—$(CH_2)_a$—O— where a is 0. In one embodiment, $R^{16}$ is $CH_2$=$CH_2$—$(CH_2)_a$—O— where a is 1.

$R^{17}$ in $Z^1$ and $Z^2$ (and $R^{19}$ in $Z^3$) is chosen from a $C_2$-$C_{10}$ divalent alkyl group, —O—$(CH_2)_b$—, or —O—C(O)—$(CH_2)_b$—, where b is 2-10.

In embodiments, A in $Z^1$, $Z^2$, and $Z^3$ are independently chosen from a C6 to C12 aryl group, a C12 to C36 fused aromatic group, a C4-C36 unsaturated alicyclic group, and a C4-C36 unsaturated heterocyclic group.

In on embodiment, A for one or more of $Z^1$, $Z^2$, or $Z^3$ is chosen from a group of the formula -$A^1$-$R^{18}$-$A^2$- where $A^1$ and $A^2$ are independently chosen from a C6 to C12 aryl group, a C12-C36 fused aromatic ring, a C5-C36 unsaturated alicyclic group, and a C5-C36 unsaturated heterocyclic group; and $R^{18}$ is chosen from a direct bond —$(CH_2)_n$—, —$C(CH_3)_2$—, —O—, —S—, —$S(O)_2$—, —C(O)—, C(O)—NH—, —NH—C(O)—NH—, C(O)—O—, —CH=N—, or —CH=N—N=CH— where n is 1-10. In embodiments, n is 1-6, 1-4, or 1-2.

Examples of suitable groups for the A groups include, but are not limited to:

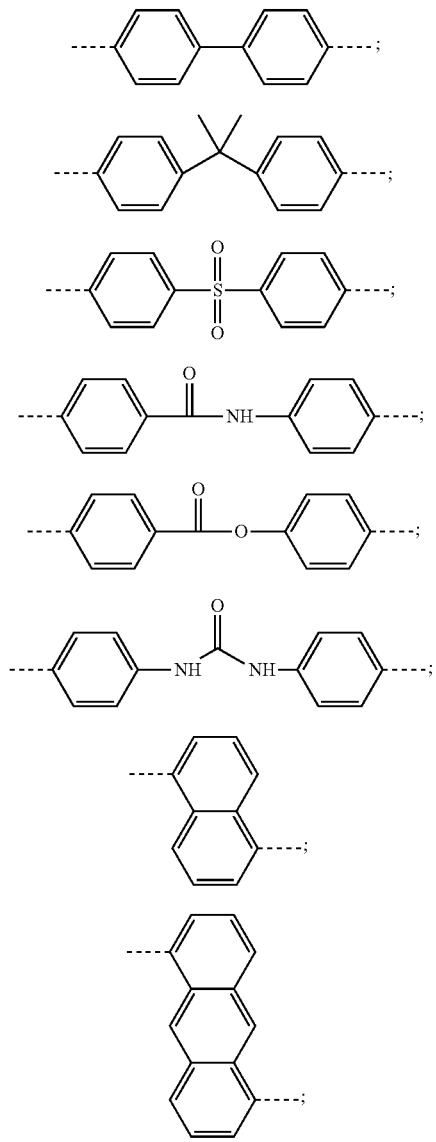

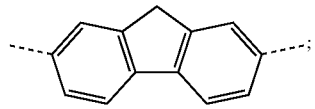

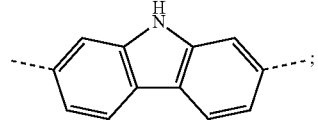

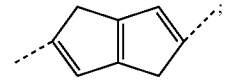

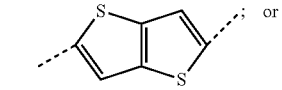

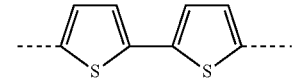

Examples of suitable $Z^3$ groups include, but are not limited to, a benzenediyl group, a naphthalenediyl group, a biphenyldiyl group, an acenaphthylene-5,6-diyl group, a pyridine-2,3-diyl group, a pyridine-2,6-diyl group, a H-imidazole-4,5-diyl group, a 1H-pyrrole-2,4-diyl group, a furan-2,5-diyl group and a thiophene-2,5-diyl group. Examples of the benzendiyl group include a 1,2-benzenediyl group, a 1,3-benzenediyl group, and a 1,4-benzenediyl group. Examples of the naphthalenediyl group include a 1,2-naphthalenediyl group, a 1,3-naphthalenediyl group, a 1,4-naphthalenediyl group, a 1,5-naphthalenediyl group, a 1,6-naphthalenediyl group, a 1,7-naphthalenediyl group, a 1,8-naphthalenediyl group, a 2,3-naphthalenediyl group, a 2,6-naphthalenediyl group, and a 2,7-naphthalenediyl group. Examples of the biphenyldiyl group include a biphenyl-4,4'-diyl group.

Examples of the biphenyldiyl group include a 4,4'-biphenyldiyl group, a 3,3'-biphenyldiyl group, a 4,4'-(2,2'-diphenylpropane)diyl group, a 3,3'-(2,2'-diphenylpropane)diyl group, a 4,4'-(diphenylsulfone)diyl group, a 3,3'-(diphenylsulfone)diyl group, a 4,4'-(3,3-diphenylhexafluoropropane)diyl group, a 3,3'-(3,3-diphenylhexafluoropropane)diyl group, a 4,4'-(diphenyl ether)diyl group, a 3,3'-(diphenyl ether)diyl group, a 4,4'-(diphenylketone)diyl group, a 3,3'-(diphenylketone)diyl group, a 4,4'-(2,2'-dimethylbiphenyl)diyl group, a 4,4'-(2,2'-bis(trifluoromethy)biphenyl)biphenyl)diyl group and a 4,4'-(2,6,2',6'-tetramethylbiphenyl)diyl group.

In one embodiment, $R^1$-$R^{12}$ are a C1-C4 alkyl, A in $Z^1$, $Z^2$, and $Z^3$ is

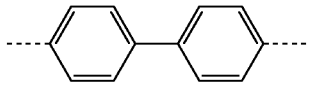

$R^{16}$ in $Z^1$ and $Z^2$ is chosen from $CH_2$=$CH_2$—$(CH_2)$a-, $CH_2$=$CH_2$—$(CH_2)$a-O— where a is 0-10; and $R^{17}$ is chosen from a C2-C10 bivalent alkyl group, —O—$(CH_2)$b-, or —O—C(O)—$(CH_2)_b$—, where b is 2-10; and $R^{19}$ in $Z^3$ is chosen from $R^{17}$. In one embodiment, $R^{16}$ is $CH_2$=$CH_2$—

$(CH_2)_a$—O— where a is 0. In one embodiment, $R^{16}$ is $CH_2=CH_2-(CH_2)_a$—O— where a is 1.

In one embodiment, $R^1$-$R^{12}$ are a C1-C4 alkyl, A in $Z^1$, $Z^2$, and $Z^3$ is

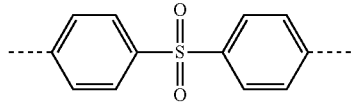

$R^{16}$ in $Z^1$ and $Z^2$ is chosen from $CH_2=CH_2-(CH_2)_a$—, or $CH_2=CH_2-(CH_2)_a$—O— where a is 0-10; and $R^{17}$ is chosen from a C2-C10 bivalent alkyl group, —O—$(CH_2)_b$—, or —O—C(O)—$(CH_2)_b$—, where b is 2-10; and $R^{19}$ in $Z^3$ is chosen from $R^{17}$. In one embodiment, $R^{16}$ is $CH_2=CH_2-(CH_2)_a$—O— where a is 0. In one embodiment, $R^{16}$ is $CH_2=CH_2-(CH_2)a$-O— where a is 1.

In one embodiment, A is chosen from any one of (A-i)-(A-xiii), and $R^{16}$ in $Z^1$ and $Z^2$ is chosen from $CH_2=CH_2-(CH_2)_a$—, $CH_2=CH_2-(CH_2)_a$—O— where a is 0-10; and $R^{17}$ is chosen from a C2-C10 bivalent alkyl group, —O—$(CH_2)_b$—, or —O—C(O)—$(CH_2)_b$—, where b is 2-10; and $R^{19}$ in $Z^3$ is chosen from $R^{17}$. In one embodiment A is chosen from any of (A-i)-(A-xiii); $R^{16}$ is chosen from $CH_2=CH_2-(CH_2)_a$—O— where a is 0 and $R'^{17}$ is chosen from —O—$(CH_2)_b$— where b is 2. In one embodiment A is chosen from any of (A-i)-(A-xiii); $R^{16}$ is chosen from $CH_2=CH_2-(CH_2)_a$—O— where a is 0 and $R^{17}$ is chosen from —O—$(CH_2)_b$ where b is 3. In one embodiment A is chosen from any of (A-i)-(A-xiii); $R^{16}$ is chosen from $CH_2=CH_2-(CH_2)_a$—O— where a is 1 and $R^{17}$ is chosen from —O—$(CH_2)_b$— where b is 2. In one embodiment A is chosen from any of (A-i)-(A-xiii); $R^{16}$ is chosen from $CH_2=CH_2-(CH_2)_a$—O— where a is 1 and $R^{17}$ is chosen from —O—$(CH_2)_b$— where b is 3.

The present polymers may be formed via hydrosilylation of an appropriate unsaturated compound and a silyl hydride in the presence of a catalyst. The unsaturated compounds to provide the $Z^1$-$Z^3$ groups may be of the formula $R^{16}$-A-$R^{16'}$ where A is as described above, and $R^{16}$ and $R^{16'}$ are independently chosen from allyl, vinyl, allyloxy, vinyloxy, acrylate, or methacrylate. In embodiments, $R^{16}$ and $R^{16'}$ are independently chosen from $CH_2=CH_2-(CH_2)_a$—, $CH_2=CH_2-(CH_2)_a$—O—$CH_2=CH_2-(CH_2)_a$—C(O)—O—, where a is 0-10. The silyl hydride may be, for example, a siloxane with terminal silyl hydride functional groups or with a Si—H containing group within the main chain of the siloxane.

Useful catalysts include those compounds or molecules that can catalyze the hysrosilylation reaction between a reactive SiH-containing moiety or substituent and a carbon-carbon bond such as a carbon-carbon double bond. Also, in one or more embodiments, these catalysts may be soluble within the reaction medium. Types of catalysts include transition metal compounds including those compounds that include a Group VIII metal. Exemplary Group VIII metals include palladium, rhodium, germanium, and platinum. Exemplary catalyst compounds include chloroplatinic acid, elemental platinum, chloroplatinic acid hexahydrate, complexes of chloroplatinic acid with sym-divinyltetramethyl-disiloxane, dichloro-bis(triphenylphosphine) platinum (II), cis-dichloro-bis(acetonitrile) platinum (II), dicarbonyldi-chloroplatinum (II), platinum chloride, and platinum oxide, zero valent platinum metal complexes such as Karstedt's catalyst, $[Cp*Ru(MeCN)_3]PF_6$, $[PtCl_2(cyclooctadiene)]$, solid platinum supported on a carrier (such as alumina, silica or carbon black), platinum-vinylsiloxane complexes (e.g., $Pt_n(ViMe_2SiOSiMe_2Vi)_c$ and $Pt[(MeViSiO)_4]_d$), platinum-phosphine complexes (e.g., $Pt(PPh_3)_4$ and $Pt(PBU_3)_4$)), and platinum-phosphite complexes (e.g., $Pt[P(Oph)_3]_4$ and $Pt[P(Obu)_3]_4$)), wherein Me represents methyl, Bu represents butyl, "Vi" represents vinyl and Ph represents phenyl, and c and d represent integers. Others include $RhCl(PPh_3)_3$, $RhCl_3$, $Rh/Al_2O_3$, $RuCl_3$, $IrCl_3$, $FeCl_3$, $AlCl_3$, $PdCl_2.2H_2O$, $NiCl_2$, $TiCl_4$, etc.

The properties or state of the polymer can be controlled or tuned by controlling various aspects of the polymer. In particular, the polymer may be provided as a liquid, a gum, or a solid by controlling the degree of polymerization, silicone chain length, and molecular weight.

In one embodiment, the silicone polymer has a number average molecular weight of from about 1000 g/mol to about 50000 g/mol; from about 2000 g/mol to about 40000 g/mol; even from about 3000 g/mol to about 10000 g/mol. Molecular weight may be determined by GPC, light scattering.

The polymers may be used to form a silicone composition. In one embodiment, the silicone composition is provided as a thermal conducting composition comprising the silicone polymer and a thermally conductive filler material. The filler materials for the thermally conductive filler (B) can be chosen from a metal oxide or a non-oxide filler. Examples of suitable non-oxide fillers include a metal boride, a metal carbide, a metal nitride, a metal silicide, carbon black, graphite, expanded graphite, carbon fiber, or graphite fiber or a combination of two or more thereof. Examples of thermally conductive fillers include, but are not limited to, alumina, magnesia, ceria, hafnia, lanthanum oxide, neodymium oxide, samaria, praseodymium oxide, thoria, urania, yttria, zinc oxide, zirconia, silicon aluminum oxynitride, borosilicate glasses, barium titanate, silicon carbide, silica, boron carbide, titanium carbide, zirconium carbide, boron nitride, silicon nitride, aluminum nitride, titanium nitride, zirconium nitride, zirconium boride, titanium diboride, aluminum dodecaboride, barytes, barium sulfate, asbestos, barite, diatomite, feldspar, gypsum, hormite, kaolin, mica, nepheline syenite, perlite, phyrophyllite, smectite, talc, vermiculite, zeolite, calcite, calcium carbonate, wollastonite, calcium metasilicate, clay, aluminum silicate, talc, magnesium aluminum silicate, hydrated alumina, hydrated aluminum oxide, silica, silicon dioxide, titanium dioxide, glass fibers, glass flake, clays, exfoliated clays, or other high aspect ratio fibers, rods, or flakes, calcium carbonate, zinc oxide, magnesia, titania, calcium carbonate, talc, mica, wollastonite, alumina, aluminum nitride, graphite, expanded graphite, metallic powders, e.g., aluminum, copper, bronze, brass, etc., fibers or whiskers of carbon, graphite, silicon carbide, silicon nitride, alumina, aluminum nitride, zinc oxide, nano-scale fibers such as carbon nanotubes, boron nitride nanosheets, zinc oxide nanotubes, etc., and mixtures of two or more thereof. In one embodiment, the thermally conductive filler has a low electrical conductivity or is electrically insulating.

The particle size of the filler materials may be chosen as desired for a particular purpose or intended application. In embodiments, the filler material has an average particle size of from about 0.01 μm to about 500 μm; from about 0.1 to about 250 μm; from about 1 to about 100 μm; from about 5 to about 75 μm; even from about 10 to about 50 μm. It will be appreciated that the composition may comprise a combination of inorganic fillers of different average particle sizes. Such combinations may be chosen as desired for a particular purpose or intended application. In one embodiment, the composition comprises a first organic filler having an average particle size from about 0.01 to about 0.1 µm; a second filler having an average particle size of about 1 µm to about 25 µm; and optionally a third filler having an average particle size of about 50 µm to about 100 µm. The first, second, and third fillers may be the same or different from one another in terms of the chemical makeup of the filler.

In the composition, the silicone polymer may be present in an amount of from about 20 vol. % to about 75 vol. % based on the total volume of the composition. In one embodiment the filler loading is from about 25 vol. % to about 70 vol. % from about 35 vol. % to about 65 vol. %, even from about 40 vol. % to about 60 vol. %. The composition may have total filler concentration, i.e., the concentration of all the fillers in the composition, of from about 25 vol. % to about 80 vol. % based on the total volume of the composition. In one embodiment the filler loading is from about 30 vol. % to about 75 vol. % from about 35 vol. % to about 65 vol. %, even from about 40 vol. % to about 60 vol. %. Here as in the claims, numerical values may be combined to form new and unspecified ranges.

The thermally conductive filler (B) comprises a combination of fillers, where at least one filler material is provided as a plurality of filler types. As used herein, a "filler type" refers to a category of filler material having a particular characteristic. Examples of characteristics defining a filler type include, for example, the morphology of the filler, the particle size of the filler, or the morphology and particle size of the filler. Examples of different embodiments of different filler types include:

a first filler type having a first particle size, and a second filler type having a second particle size, where the first and second filler types have the same morphology a first filler type having a first morphology, and a second filler type having a second morphology, where the first and second filler types have the same particle size;

a first filler type having a first morphology, and a second filler type having a second morphology, where the first and second filler types have different particle sizes.

In the above embodiments, the first and second filler may be a single type of filler or may itself be provided with multiple filler types.

In one embodiment, the first filler and the second filler are each provided by a plurality of filler types of the respective filler materials. The composition may include any combination of a first filler and a second filler, where (i) the first filler is provided by:

a first filler type having a first particle size, and a second filler type having a second particle size, where the first and second filler types have the same morphology;

a first filler type having a first morphology, and a second filler type having a second morphology, where the first and second filler types have the same particle size; or a first filler type having a first morphology, and a second filler type having a second morphology, where the first and second filler types have different particle sizes; and (ii) the Second Filler is Provided by:

a second filler type having a first particle size, and a second filler type having a second particle size, where the first and second filler types have the same morphology;

a second filler type having a first morphology, and a second filler type having a second morphology, where the first and second filler types have the same particle size; or a second filler type having a first morphology, and a second filler type having a second morphology, where the first and second filler types have different particle sizes.

So, for example, in one embodiment, there may be provided (a) a first filler provided by (i) a first filler type having a first particle size, and (ii) a second filler type having a second particle size; and (b) a second filler provided by (i) a first filler type having a first particle size, and (ii) a second filler type having a second particle size. In another embodiment, the composition may comprise (a) a first filler provide by (i) a first filler type having a first particle size, and (ii) a second filler type having a second particle size, where the first and second filler types have the same morphology; and (b) a second filler provided by (i) a first filler type of a first morphlogy, and (ii) a second filler type of a second morphology.

It will be appreciated that while the above description refers to a first filler and a second filler, the composition is not limited to two fillers. The composition may comprise two, three, four, five, etc., or more fillers, where at least one of the fillers is provided by a plurality of filler types of that filler material. Optionally, each of the fillers may be provided by a plurality of filler types of the respective filler materials.

In one embodiment, the composition comprises a first filler chosen from a metal oxide, and the second filler is chosen from a non-oxide filler (e.g., a nitride, a carbide, a silicide, etc.). In one embodiment, the metal oxide filler is provided as a plurality of filler types of different particle sizes, and the non-oxide filler is provided as a single filler type (e.g., a filler of a particular morphology and particle size). In another embodiment, (a) the metal oxide filler comprises a first filler type of a first particle size and a second filler type of a second particle size; and (b) the non-oxide filler comprises (i) a first filler type of a first morphology, and (ii) a second filler type of a second morphology.

The morphology of the respective fillers may chosen as desired. In one embodiment, the morphology of the filler may be chosen from spherical, platelet, agglomerates, spherical agglomerates, and graphitic.

In one embodiment, the first and second thermally conductive filler materials have a particle size of 0.3 to about 350 microns. In one embodiment, the thermally conductive filler has a particle size of about 0.5 to 150 microns; about 1 to about 100 microns, about 10 to 90 microns; about 20 to 75 microns; even about 40 to 60 microns.

The composition may have total filler concentration, i.e., the concentration of all the fillers in the composition, of from about 25 vol. % to about 80 vol. % based on the total volume of the composition. In one embodiment the filler loading is from about 30 vol. % to about 75 vol. % from about 35 vol. % to about 65 vol. %, even from about 40 vol. % to about 60 vol. %. Here as in the claims, numerical values may be combined to form new and unspecified ranges.

The composition may comprise from about 10 vol. % to 90 vol. % of the first filler and 90 vol. % to 10 vol. % of the second filler; from about 30 vol. % to 70 vol. % of the first filler and 70 vol. % to 30 vol. % of the second filler; even from about 40 vol. % to about 60 of the first filler and about 60 vol. % to about 40 vol. % of the second filler.

Regarding the different filler types contributing to the first and/or second fillers, the concentration of the different filler types may be chose as desired. In one embodiment, the first filler comprises a first filler type in an amount of about 5 vol. % to about 95 vol. % and a second filler type in an amount of about 95 vol. % to about 5 vol. % based on the total volume of the first filler; a first filler type in an amount of about 10 vol. % to about 80 vol. % and a second filler type in an amount of about 20 vol. % to about 90 vol. % based on the total volume of the first filler; a first filler type in an amount of about 30 vol. % to about 60 vol. % and a second filler type in an amount of about 70 vol. % to about 40 vol. % based on the total volume of the first filler. In one embodiment, the first filler comprises a first filler type in an amount of about 20 vol. % to about 40 vol. % and a second filler type in an amount of about 80 vol. % to about 60 vol. % based on the total volume of the first filler.

In one embodiment, the thermally conductive filler includes a boron nitride. Examples of suitable boron nitride materials include boron nitride particles, boron nitride agglomerates, or a mixture thereof. Boron nitride particles generally exhibit a platelet form. In one embodiment, the boron nitride particles can be platelets having a particle size of 0.3 to about 350 microns. In one embodiment, the platelet boron nitride particles have a particle size of about 0.5 to 150 microns; about 1 to about 100 microns, about 10 to 90 microns; about 20 to 75 microns; even about 40 to 60 microns. In another embodiment, the thermally conductive plastic composition comprises boron nitride agglomerates. The agglomerates can have a mean particle size of from about 5 to about 500 microns and a surface area of about 0.25 to about 50 m$^2$/gram. In one embodiment, the platelet boron nitride particles have a particle size of about 10 to 400 microns; about 20 to about 300 microns, about 30 to 200 microns; about 40 to 150 microns; even about 50 to 100 microns. Particle size can be measured using a Horiba LA300 particle size distribution analyzer where the particle to be analyzed (e.g., BN) is introduced in an amount adjusted to meet the required transmission. A few drops of 2% Rhodapex CO-436 can be added to improve the dispersion of the powder, and the particle size can be measured using laser diffraction after a 3 second sonication. The particle size distribution resulting from the measurement can be plotted on a volume basis and the D90 represents the 90$^{th}$ percentile of the distribution.

In one embodiment, the filler may be functionalized with a functionalization additive such as, for example, a silane additive. In one embodiment, the silane additive can be chosen from an alkoxy silane, alkacryloxy silane, a vinyl silane, a halo silane (e.g., a chlorosilane), a mercapto silane, a blocked mercaptosilane, a thiocarboxylate silane, titanate salts, zirconate salts, Sorbitan stearate, or a combination of two or more thereof. In one embodiment, the fillers can comprise from about 1 to about 5 wt. % of a silane; from about 1.5 to about 4 wt. %; even from about 2.7 to about 3.7 wt. % of the fillers.

In one embodiment, the composition comprises a first filler chosen from a metal oxide, and a second filler chosen from a non-oxide filler where the first filler and/or the second filler comprises a plurality of filler types. In one embodiment, the first filler is a metal oxide comprising a first type of metal oxide and a second type of metal oxide, which may be the same or different metal oxide in terms of chemical make up, and the second filler comprises a single type of non-oxide filler, where any of the following (alone or in combination) may be employed:

the first type of metal oxide has a first particle size, and the second type of metal oxide has a second particle size different from the first particle size;

the first and second type of metal oxide independently have a particle size of from about 0.3 to about 350 microns, where the first and second type of metal oxide have a different particle size;

the first type of metal oxide has a first morphology, and the second type of metal oxide has a second morphology different from the first morphology;

the metal oxide filler is chosen from alumina, magnesia, ceria, hafnia, lanthanum oxide, neodymium oxide, samaria, praseodymium oxide, thoria, urania, yttria, zinc oxide, and/or zirconia;

the non-metal oxide filler is chosen from silicon carbide, silica, boron carbide, titanium carbide, zirconium carbide, boron nitride, silicon nitride, aluminum nitride, titanium nitride, zirconium nitride, or zirconium boride;

the first filler is alumina, and the second filler is boron nitride;

the second filler is a boron nitride chosen from spherical, platelet, agglomerates, or spherical agglomerates.

In one embodiment, the composition comprises a first filler chosen from a metal oxide, and a second filler chosen from a non-oxide filler where the first filler and the second filler each comprises a plurality of filler types. In one embodiment, the first filler is a metal oxide comprising a first type of metal oxide and a second type of metal oxide, where the first and second type of metal oxide may have the same or different chemical composition or formula (but differ at least in respect of particle size and/or morphology), and the second filler comprises a single type of non-oxide filler, where any of the following may be employed in combination with one another:

the first type of metal oxide has a first particle size, and the second type of metal oxide has a second particle size different from the first particle size;

the first and second type of metal oxide independently have a particle size of from about 0.3 to about 350 microns, where the first and second type of metal oxide have a different particle size;

the first type of metal oxide has a first morphology, and the second type of metal oxide has a second morphology different from the first morphology;

the first type of metal oxide has a first particle size, and the second type of metal oxide has a second particle size different from the first particle size;

the metal oxide filler is chosen from alumina, magnesia, ceria, hafnia, lanthanum oxide, neodymium oxide, samaria, praseodymium oxide, thoria, urania, yttria, zinc oxide, and/or zirconia;

the non-metal oxide filler is chosen from silicon carbide, silica, boron carbide, titanium carbide, zirconium carbide, boron nitride, silicon nitride, aluminum nitride, titanium nitride, zirconium nitride, or zirconium boride;

the first filler is alumina, and the second filler is boron nitride;

the second filler comprises platelet boron nitride and boron nitride agglomerates.

In one embodiment, the composition comprises a first filler having a first filler type of a particle size of from about 0.3 to about 350 microns, and a second filler type having a particle size of from about 0.3 to about 350 microns, where the second filler type of the first filler has a different particle size from the first filler type. In one embodiment, the composition comprises a first filler with a first filler type having a particle size of from about 0.3 to about 350 microns, and a second filler type having a particle size of from about 0.3 to about 15 microns. In one embodiment, the composition comprises a first filler having a first filler type with a particle size of from about 45 to about 350 microns and a second filler type having a particle size of form about 0.3 to about 5 microns. In one embodiment, the composition comprises a first filler with a first filler type having a particle size of from about 5 to about 70 microns, and a second filler type having particle size of from about 0.5 to about 15 microns. In one embodiment, the first filler comprises alumina.

The particle size of the filler materials may be chosen as desired for a particular purpose or intended application. In embodiments, the filler material has an average particle size of from about 0.01 µm to about 500 µm; from about 0.1 to about 250 µm; from about 1 to about 100 µm; from about 5 to about 75 µm; even from about 10 to about 50 µm. It will be appreciated that the composition may comprise a combination of inorganic fillers of different average particle sizes. Such combinations may be chosen as desired for a particular purpose or intended application. In one embodiment, the composition comprises a first organic filler having an average particle size from about 0.01 to about 0.1 µm; a second filler having an average particle size of about 1 µm to about 25 µm; and optionally a third filler having an average particle size of about 50 µm to about 100 µm. The first, second, and third fillers may be the same or different from one another in terms of the chemical makeup of the filler.

The present compositions are curable and may be cured by either condensation curing mechanisms or thermal curing mechanisms. In one embodiment, the compositions are condensation curable. For a condensation curable composition, the composition may include any suitable components to promote condensation curing. The composition may optionally comprise a condensation catalyst which promotes the condensation of completely or partially hydrolyzed topcoat material. The catalyst can be a catalyst suitable for promoting the curing of siloxanes. Advantageously, condensation catalysts can be employed. Suitable condensation catalysts include, but are not limited to, dialkyltin dicarboxylates such as dibutyltin dilaurate and dioctyltin dilaurate, tertiary amines, the stannous salts of carboxylic acids, such as stannous octoate and stannous acetate, etc. Other useful catalysts include zirconium-containing, aluminum-containing, and bismuth-containing complexes such as K-KAT® XC6212, K-KAT® 5218 and K-KAT® 348, supplied by King Industries, Inc., titanium chelates such as the TYZOR® types, available from DuPont company, and the KR types, available from Kenrich Petrochemical, Inc., and other organometallic catalysts, e.g., those containing a metal such as Al, Zn, Co, Ni, Fe, etc.

In one embodiment, the compositions are thermal curable and comprise a thermal cure catalyst. In one embodiment, the thermal cure catalyst is chosen from an alkyl ammonium carboxylate. The alkyl ammonium carboxylate may be a di-, tri-, or tetra-ammonium carboxylate. In one embodiment, the catalyst is chosen from a tetrabutylammonium carboxylate of the formula: $[(C_4H_9)_4N]^+[OC(O)-R]^-$, wherein R is selected from the group consisting of hydrogen, alkyl groups containing about 1 to about 8 carbon atoms, and aromatic groups containing about 6 to 20 carbon atoms. In embodiments, R is a group containing about 1 to 4 carbon atoms, such as methyl, ethyl, propyl, butyl, and isobutyl. Exemplary catalysts are tetra-n-butylammonium acetate (TBAA), tetra-n-butylammonium formate, tetra-n-butylammonium benzoate, tetra-n-butylammonium-2-ethylhexanoate, tetra-n-butylammonium-p-ethylbenzoate, and tetra-n-butylammonium propionate, or a combination of two or more thereof. Particularly suitable catalysts are tetra-n-butylammonium acetate and tetra-n-butylammonium formate, tetramethylammonium acetate, tetramethylammonium benzoate, tetrahexylammonium acetate, dimethylanilium formate, dimethylammonium acetate, tetramethylammonium carboxylate, tetramethylammonium-2-ethyl hexanoate, benzyltrimethylammonium acetate, tetraethylammonium acetate, tetraisopropylammonium acetate, triethanol-methylammonium acetate, diethanoldimethylammonium acetate, monoethanoltrimethylammonium acetate, ethyltriphenylphosphonium acetate.

Generally, the catalyst should be added in an amount that will not affect or impair the physical properties of the coating, but in a sufficient amount to catalyze the curing reaction. In one embodiment, the catalyst is provided in an amount ranging from 1 ppm to about 75 ppm; from about 10 ppm to about 70 ppm; even from about 20 ppm to about 60 ppm. Here, as elsewhere in the specification and claims, numerical values may be combined to form new and non-disclosed ranges. The "ppm" value of the catalyst may be defined as total moles of catalyst per total weight solid of the coating.

The present polymers have been found to exhibit desirable properties that may make them suitable for a wide variety of applications. The polymers have high thermal stability, refractive index, and thermal conductivity. The have excellent wetting behavior when combined with inorganic fillers such that the fillers are readily dispersed in the polymer. These properties allow for providing a composition with excellent thermal conductivity. The compositions may be employed in a variety of applications including as a thermal grease, adhesive, thermal gel, potting material, gap filler material, etc.

Also provided is an article comprising the compositions disposed on at least a portion of a surface of the article disposed on at least a portion of a surface of the article. The article can be a single layer or may comprise multiple layers. In one embodiment, the article comprises multiple layers, and the composition is disposed on a surface in between at least two of the layers. Non-limiting examples of suitable articles include an electronic article, an automotive article, a home appliance article, smart appliance article, a telecommunication article, a healthcare article, a personal care article, an agricultural article, a molded article, a masonry surface, a textile material, a home care material. In embodiments, the article may comprise, but is not limited to, light emitting devices, computer devices, a stacked die, mobile phones, tablets, flip chip package, hybrid memory cube, touch screens, Wi-Fi device, automotive technology hifi systems, a through-silicon via device, and audio systems, in joints between heat pipes and water tanks in solar heated heating, in fuel cells and wind turbines, in the manufacture of computer chips, gaming consoles, data transfer devices, in light devices, batteries, in housings, coolers, heat exchanging devices, wires, cables, heating wires, refrigerators, dishwashers, air conditionings, accumulators, transformers, lasers, functional clothing, car seats, medical devices, fire protection, electric motors, planes, and trains, as a filament for 3D printing material, drug delivery systems, transdermal patches, wound healing patches, wound dressing patches, patches for scar reduction, transdermal iontophoresis, scaffold for tissue engineering, anti-microbial devices, wound management devices, ophthalmic devices, bioinserts, prostheses, body implants, paint, structural coating, masonry coating, or marine coating, seed coating, superspreader or controlled release fertilizer.

The composition may be applied to a surface in any suitable manner for dispensing or applying compositions. In one embodiment, the composition may be applied by dispensing under pressure or stencil printing or screen printing or jet printing or 3D printing. The thickness of the composition may be chosen as desired for a particular purpose or intended application. In embodiments, the thickness of the composition is from 0.01 mm to 15 cm.

The compositions may also be employed in personal care products. Examples of suitable personal care products include, but are not limited to, those in the form of an antiperspirant/deodorant, a shaving product, a skin lotion, a moisturizer, a toner, a bath product, a cleansing product, a shampoo, a conditioner, a combined shampoo/conditioners, a mousse, a styling gel, a hair spray, a hair dye, a hair color product, a hair bleach, a waving products, a hair straightener, a nail polish, a nail polish remover, a nail cream or lotions, a cuticle softener, a sunscreen, an insect repellent, an anti-aging product, a lipstick, a foundation, a face powder, an eye liner, an eye shadow, a blush, a makeup, a mascara, a moisturizing preparation, a foundation, a body and hand preparation, a skin care preparation, a face and neck preparation, a tonic, a dressing, a hair grooming aid, an aerosol fixative, a fragrance preparation, an aftershave, a make-up preparation, a soft focus application, a night and day skin care preparation, a non-coloring hair preparation, a tanning preparation, a synthetic and non-synthetic soap bar, a hand liquid, a nose strip, a non-woven application for personal care, a baby lotion, a baby shampoo, a baby conditioner, a shaving preparation, a cucumber slices, a skin pads, a make-up remover, a facial cleansing product, a cold cream, a sunscreen product, a spritzer, a paste mask and mud, a face mask, a cologne and toilet water, a hair cuticle coat, a shower gel, a face and body wash, a personal care rinse-off products, a gel, a foam bath, a scrubbing cleanser, an astringent, a nail conditioner, an eye shadow stick, a powder for face or eye, a lip balm, a lip gloss, a hair care pump spray, a hair-frizz-control gel, a hair leave-in conditioner, a hair pomade, a hair de-tangling product, a hair fixative, a hair bleach product, a skin lotion, a pre-shave and pre-electric shave, an anhydrous cream and lotion, an oil/water emulsion, a water/oil emulsion, a water-resistant cream or lotion, an anti-acne preparation, a mouth-wash, a massage oil, a toothpaste, a clear gel or stick, an ointment base, a topical wound-healing product, an aerosol talc, a barrier spray, a vitamin and anti-aging preparation, an herbal-extract preparation, a bath salt, a bath and body milk, a hair styling aid, a hair-, eye-, nail- and skin-soft solid application, a controlled-release personal care product, a hair conditioning mist, a skin care moisturizing mist, a skin wipe, a pore skin wipe, a pore cleaner, a blemish reducer, a skin exfoliator, a skin desquamation enhancer, a skin towelette or cloth, a depilatory preparation, or a personal care lubricant.

It will be appreciated that in a personal care product, the product may include any other materials suitable for forming such products including, but not limited to pigment, film formers, emulsifiers, vitamins, plasticizers, surfactants, antioxidants, waxes, oils, solvents, etc.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

EXAMPLES

Example 1: Diphenyl sulfone Functionalized Polyorganosiloxane Bearing Terminal Allyoxy Ether group (A1)

To a solution of Allyloxy diphenyl sulfone (16.9 g, 0.051 mol) & Karstedt's catalyst (5 ppm of 2 wt % Pt) in toluene (100 mL) in a three neck round bottom flask fitted with a reflux condenser, dropping funnel, and a mechanical stirrer under nitrogen environment, polydimethylsiloxane bearing terminal hydride group (Hyd eqv. 0.952) (334.52 g, 0.151 mol) was added dropwise over a period of 30 min. The reaction temperature increased to 85° C. and allowed to continue till all the hydride peak disappeared from the $^1$H-NMR. The resulting allyloxy ether terminated polymer was vacuum stripped at 150 degree Celsius for 3 h to remove the volatile compounds and the solvent. The product was obtained as a high viscous liquid. (GPC: $M_n$=12392, PDI-1.8; Vis: 6 Pa·S).

Example 2: Diphenyl Sulfone Functionalized Polyorganosiloxane Bearing Terminal Hydride Groups To a solution of Allyloxy diphenyl sulfone (25 g, 0.076 mol) & Karstedt's catalyst (0.09 g, 5 ppm of 2 wt % Pt) in Toluene (150 mL) at 75° C., polydimethylsiloxane bearing terminal hydride group (Hyd eqv. 0.952) (334.52 g, 0.151 mol) was added dropwise over a period of 30 min. The reaction temperature was subsequently increased to 85° C. and allowed to continue till all the allylic peak disappeared from the $^1$H-NMR. The resulting hydride terminated polymer was vacuum stripped at 150 degree Celsius for 3 h to remove the volatile compounds and the solvent. The product was obtained as a low viscous liquid. (GPC: $M_n$=3069 g/mol, PDI-1.7; Vis: 0.33 Pa·S).

Example 3 (A2): Diphenyl Sulfone Functionalized Polyorganosiloxane Bearing Terminal Vinyl Groups To a reaction mixture of hydride terminated diphenyl sulfone functionalized polyorganosiloxane (71.9 g) (obtained in the example 3), toluene (30 mL), and platinum catalyst (5 ppm of 2% Pt) was added 1,3-Divinyltetramethyldisiloxane (8.88 g, 0.048 mol) and refluxed at 110 degree Celsius. The reaction was continued till all the hydride signals disappeared from the $^1$H-NMR. The resulting polymer was finally vacuum stripped at 150 degree Celsius for 3 h to remove the volatile compounds and the solvent. The final product was obtained as a low viscous liquid. (GPC: Mn=5014 g/mol, PDI-1.9; Vis: 0.56 Pa·S).

Preparation of Thermally Conductive Silicone Composition

Alumina oxide fillers of size varying from 0.3-110 micron were purchased from Sumitomo. Boron nitride fillers of size ranging from 5 to 400µ were procured from Momentive Performance Materials.

Non-curable thermal grease compositions were prepared by uniformly mixing either vinyl terminated dimethylsiloxane copolymer (B1) (vinyl eqv.=0.178, Viscosity=0.4 Pa·s) or polyorganosiloxane copolymers (A1) with thermal fillers in planetary centrifugal mixer (Thinky mixer: ARE-310) at 2000 rpm for 30 seconds.

Thermally conducting curable compositions were developed by mixing different fillers of variable sizes and shapes into a pre-mixed homogeneous liquid silicone compositions consisting of vinyl terminated dimethylsiloxane copolymer (B1) (vinyl eqv=0.178, Viscosity=0.4 Pa·s), polyorganosiloxane copolymers (A1), hydride terminated polydimethylsiloxane (C1), silicone hydride fluids (D1/D2), platinum catalyst (8 ppm), and inhibitor diallyl maleate (80 ppm) using thinky mixer at 2000 rpm for 30 seconds. The compositions were degassed, placed in rectangular mold and finally pressed inside a compression molding instrument at 150° C. and at a pressure of 14 psi for 30 min to form elastomeric pads.

Thermally conducting pre cured gel compositions were prepared by mixing different fillers of variable sizes and shapes into a homogeneous mixer of polyorganosiloxane provided in the example 1, A-580, a polyalkylsiloxane silicone fluid containing alkoxy group from GE Toshiba of Japan (E1) and pre-cured silicone gel (F1) (trade name F-C4936) obtained from Momentive Performance Materials.

Bulk thermal conductivity of the thermal grease, pads, and gels was measured using TP 500S hot disk instrument at 22° C. The hardness of the pads was measured using ASTMD2240 Type durometer (Type E). Viscosity of the thermal grease samples was measured using Brookfield Viscometer (DV 1 digital viscometer, 10 S$^{-1}$).

Viscosity and thermal conductivity results of the non-curable thermal grease samples containing combination of spherical alumina fillers of varying sizes are reported in Table 1.

TABLE 1

| Compositions | Polymer (A1) (Vol %) | Polymer (B1) (Vol %) | Filler* (Vol %) | Thermal Conductivity (W/mK) | Viscosity |
|---|---|---|---|---|---|
| Ex. 3 | 51 | | 49 | 1.6 | 67 |
| Ex. 4 | 31.6 | | 68.4 | 3.4 | 103 |
| Ex. 5 | 26.6 | | 73.4 | 4.6 | 240 |
| Ex. 6 | 19.5 | | 80.5 | 7.4 | >2000 |
| Comparative Ex. 3 | | 51 | 49 | 1.3 | 56 |
| Comparative Ex. 4 | | 31.6 | 68.4 | 3.1 | 91 |
| Comparative Ex. 5 | | 26.6 | 73.4 | 4.2 | 193 |
| Comparative Ex. 6 | | 19.5 | 80.5 | 6.3 | >2000 |

*Spherical Alumina → 0.4-3 μm/3-12 μm/50-100 μm (20/20/60)

Viscosity and thermal conductivity results of the non-curable thermal grease samples containing polyorganosiloxane (A2) & combination of spherical alumina and boron nitride of platelet and agglomerated morphology are reported in Table 2

TABLE 2

| Compositions | Ex-7 | Ex-8 | Ex-9 | Ex-10 | Ex-11 | Ex-12 | Ex-13 | Ex-14 |
|---|---|---|---|---|---|---|---|---|
| Alumina# (0.4-3 μm) | 16.7 | 36 | 6.7 | 12 | 12 | 24 | 24 | 24 |
| Alumina# (3-12 μm) | 33.3 | | 13.3 | 24 | 24 | 12 | 12 | 12 |
| BN* (30-50 μm) | 50 | 12.8 | | | 32 | 21 | 21 | 21 |
| BN** (110-150 μm) | | 51.2 | 80 | 64 | 32 | | | |
| BN** (300-370 μm) | | | | | | 43 | 43 | 43 |
| Polymer (A2) (Vol %) | 33 | 33 | 33 | 33 | 33 | 33 | 31 | 29 |
| Filler (Vol %) | 67 | 67 | 67 | 67 | 67 | 67 | 69 | 71 |
| TC (W/mK) | 6.1 | 7.3 | 8.65 | 6.2 | 8.0 | 7.0 | 8.4 | 9.8 |

*Platelet morphology;
**Agglomerated morphology,
Spherical morphology

As shown in Table 1, compositions comprising the present polymers exhibit excellent thermal conductivity, especially compared to other comparable compositions using a conventional siloxane. Further, the data in Table 2 shows that by changing the filler combination, distribution ratios, & volume loading the thermal conductivity of the polyorganosiloxane copolymer can be tuned and improved to a significant extent Thermal conductivity & hardness results of the cured thermal pad samples containing combination of spherical alumina and boron nitride of platelet and agglomerated morphology are reported in Table 3

TABLE 3

| Compositions | Ex-15 | Ex-16 |
|---|---|---|
| B1 | 9 | 10.6 |
| A1 | 11.6 | 11.6 |
| C1 | 8.2 | 7.8 |
| D1 | | 0.9 |
| D2 | 2 | |
| Alumina (0.4-3 μm) | 24 | 24 |
| Alumina (3-12 μm) | 12 | 12 |
| BN* (30-50 μm) | 21 | 21 |
| BN** (110-150 μm) | | |
| BN** (300-370 μm) | 43 | 43 |
| Total Filler (Vol %) | 69 | 69 |
| TC (W/mK) | 10.7 | 9.2 |
| Hardness (Shore E) | 80 | 25 |

Thermal conductivity results of the thermal gel samples containing combination of spherical alumina and boron nitride of platelet and agglomerated morphology are reported in Table 4

TABLE 4

| Compositions | Ex-17 | Ex-18 | Ex-19 |
|---|---|---|---|
| A1 | 26.4 | 12.4 | 12.4 |
| E1 | | 12.4 | 12.4 |
| F1 | 6.6 | 6.2 | 6.2 |
| Alumina (0.4-3 μm) | 24 | 12 | 24 |
| Alumina (3-12 μm) | 12 | 24 | 12 |
| BN* (30-50 μm) | 21 | 32 | 21 |
| BN** (110-150 μm) | | 32 | |
| BN** (300-370 μm) | 43 | | 43 |
| Total Filler (Vol %) | 67 | 67 | 69 |
| TC (W/mK) | 7.7 | 8.4 | 9.3 |

TABLE 4-continued

| Compositions | Ex-17 | Ex-18 | Ex-19 |
|---|---|---|---|
| Appearance | Non-flow able Soft gel | Non-flow able Soft gel | Non-flow able Soft gel |

The gel formulations developed with the polyorganosiloxane copolymer were found highly dispensable with no oil bleed out properties.

While the above description contains many specifics, these specifics should not be construed as limitations on the scope of the invention, but merely as exemplifications of preferred embodiments thereof. Those skilled in the art may envision many other possible variations that are within the scope and spirit of the invention as defined by the claims appended hereto.

What is claimed is:

1. A composition comprising:
   (A) a siloxane polymer, wherein the siloxane polymer (I) is of the formula:

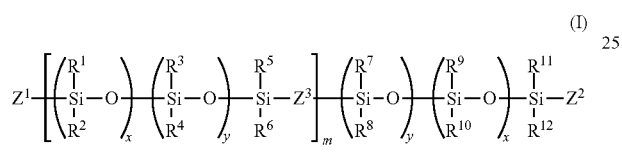

(I)

where $R^1$-$R^{12}$ are independently chosen from a hydrogen, a C1-C10 monovalent hydrocarbon group optionally containing a hetero atom, a C6-C20 monovalent aromatic group optionally containing a hetero atom, and a C4 to C30 monovalent saturated or unsaturated cycloalkyl group optionally containing a hetero atom, siloxy group containing 1-20 silicone atoms, $Z^1$ or $Z^2$;
   $Z^1$ and $Z^2$ are independently chosen from a hydrogen, C1-C10 hydrocarbon group optionally containing heteroatom, —OH, —$NH_2$, —COOH, or $R^{16}$-A-$R^{17}$— where A in $Z^1$ and $Z^2$ is an unsaturated cyclic group chosen from a aromatic group, a functionalized aromatic group, a fused aromatic group optionally containing a heteroatom, a unsaturated alicyclic group, a unsaturated heterocyclic group, or a combination of two or more thereof; $R^{16}$ and $R^{17}$ are independently chosen from a nil, C1-C10 hydrocarbon group optionally containing a hetero atom, a C6-C20 aromatic group optionally containing a hetero atom, and a C4 to C30 saturated or unsaturated cycloalkyl group optionally containing a hetero atom;
   $Z^3$ is chosen from $R^{19}$-A-$R^{19}$— where A in $Z^1$ and $Z^2$ is an unsaturated cyclic moiety chosen from an aromatic group, a fused aromatic group, an unsaturated alicyclic group, an unsaturated heterocyclic group, or a combination of two or more thereof; and $R^{19}$ is chosen from a nil, C1-C10 hydrocarbon group optionally containing a hetero atom, a C6-C20 aromatic group optionally containing a hetero atom, and a C4 to C30 saturated or unsaturated cycloalkyl group optionally containing a hetero atom;
   m is 1-100; x is 0-200; and y is 0-200 wherein x+y≥1; and
   (B) (i) a first filler, and (ii) a second filler, where at least one of the first filler and/or the second filler comprises a plurality of filler types differing from one another in terms of particle size on a volume basis and/or morphology.

2. The composition of claim 1, wherein A in $Z^1$, $Z^2$, and $Z^3$ is independently chosen from a C6 to C12 aromatic group; a C10-C36 fused aromatic ring group; a C4-C36 unsaturated alicyclic group; and a C4-C36 unsaturated heterocyclic group.

3. The composition of claim 1, wherein A in one or more of $Z^1$, $Z^2$, and $Z^3$ is chosen from a group of the formula $A^1$-$R^{18}$-$A^2$- where $A^1$ and $A^2$ are independently chosen from a C6 to C12 aryl group, C12-C36 fused aromatic ring group, a C5-C36 unsaturated alicyclic group, and a C5-C36 unsaturated heterocyclic group; and R" is chosen from a direct bond —$(CH_2)_n$—, —$C(CH_3)_2$—, —O—, —S—, —$S(O)_2$—, —C(O)—, C(O)—NH—, —NH—C(O)—NH—, C(O)—O—, —CH=N—, or —CH=N—N=CH— where n is 1-10.

4. The composition of claim 2, wherein A is independently chosen from

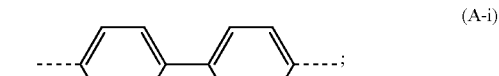

(A-i)

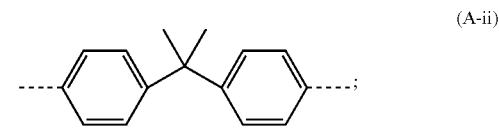

(A-ii)

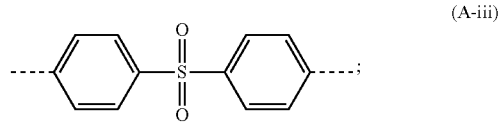

(A-iii)

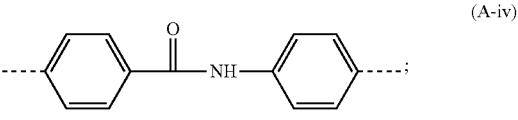

(A-iv)

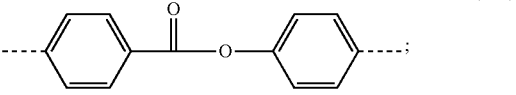

(A-v)

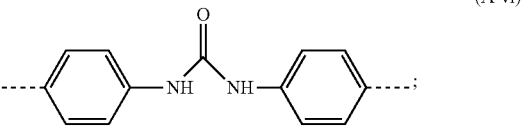

(A-vi)

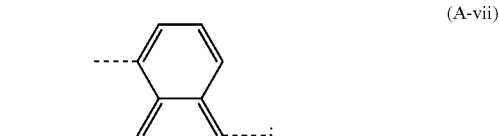

(A-vii)

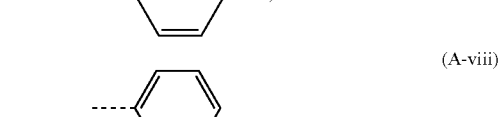

(A-viii)

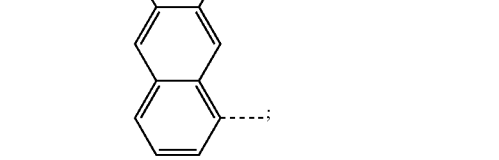

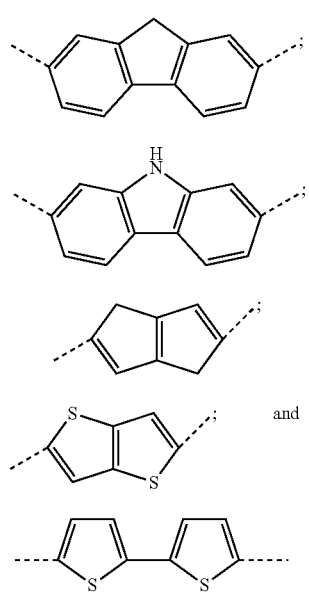

5. The composition of claim 1, wherein A in $Z^1$, $Z^2$, and $Z^3$ is

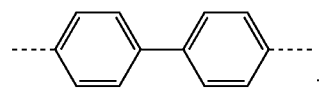

6. The composition of claim 1, wherein A in $Z^1$, $Z^2$, and $Z^3$ is

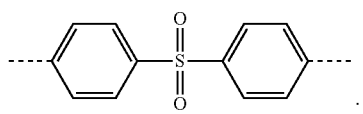

7. The composition of claim 1 wherein the siloxane polymer has number average molecular weight of from about 1000 g/mol to about 50000 g/mol.

8. The composition of claim 1, wherein the first and second fillers are independently chosen from alumina, magnesia, ceria, hafnia, lanthanum oxide, neodymium oxide, samaria, praseodymium oxide, thoria, urania, yttria, zinc oxide, zirconia, silicon aluminum oxynitride, borosilicate glasses, barium titanate, silicon carbide, silica, boron carbide, titanium carbide, zirconium carbide, boron nitride, silicon nitride, aluminum nitride, titanium nitride, zirconium nitride, zirconium boride, titanium diboride, aluminum dodecaboride, barytes, barium sulfate, asbestos, barite, diatomite, feldspar, gypsum, hormite, kaolin, mica, nepheline syenite, perlite, phyrophyllite, smectite, talc, vermiculite, zeolite, calcite, calcium carbonate, wollastonite, calcium metasilicate, clay, aluminum silicate, talc, magnesium aluminum silicate, hydrated alumina, hydrated aluminum oxide, silica, silicon dioxide, titanium dioxide, glass fibers, glass flake, clays, exfoliated clays, or other high aspect ratio fibers, rods, or flakes, calcium carbonate, zinc oxide, magnesia, titania, calcium carbonate, talc, mica, wollastonite, alumina, aluminum nitride, graphite, graphene, aluminum powder, copper powder, bronze powder, brass powder, fibers or whiskers of carbon, graphite, silicon carbide, silicon nitride, alumina, aluminum nitride, zinc oxide, carbon nanotubes, boron nitride nanosheets, zinc oxide nanotubes, metal particles or a combination of two or more thereof.

9. The composition of claim 8, wherein metal particles are selected from aluminum, magnesium, zinc, iron, titanium, argentum, aurum, platinum, nickel, copper, tin, lead or combination thereof.

10. The composition of claim 1, wherein the filler has a particle size of from about 0.01 μm to about 500 μm.

11. The composition of claim 1, wherein the first filler having an average particle size from about 0.01 to about 0.1 μm; the second filler having an average particle size of about 1 μm to about 25 μm; and optionally a third filler having an average particle size of about 50 μm to about 100 μm.

12. The composition of claim 11, wherein the first, second, and third fillers are alumina.

13. The composition of claim 1 comprising about 10 vol. % to about 90 vol. % of the first filler and about 90 vol. % to about 10 vol. % of the second filler.

14. The composition of claim 1 wherein the fillers are treated with a surface functionalizing agent.

15. The composition of claim 14, wherein the surface functionalizing agent is chosen from an functionalized siloxane, alkoxy silane, an alkacryloxy silane, a vinyl silane, a halo silane (e.g., a chlorosilane), a mercapto silane, a blocked mercaptosilane, a thiocarboxylate silane, titanate salts, zirconate salts, Sorbitan stearate, or a combination of two or more thereof.

16. The composition of claim 1, comprising a first filler and a second filler, wherein the first and second filler are independently chosen from a metal oxide filler and a non-oxide filler.

17. The composition of claim 16, wherein the non-oxide filler is chosen from a metal boride, a metal carbide, a metal nitride, a metal silicide, carbon black, graphite, expanded graphite, carbon fiber, or graphite fiber or a combination of two or more thereof.

18. The composition of claim 1, wherein the plurality of filler types independently have an average particle size of from about 0.3 micron to about 350 micron, the plurality of filler types having average particle sizes different from one another.

19. The composition of claim 1, wherein the plurality of filler types have a morphology different from one another, the morphology being chosen from spherical, platelet, agglomerates, spherical agglomerates and graphitic.

20. The composition of claim 1, wherein the first filler is chosen from aluminum oxide, and the second filler is chosen from boron nitride.

21. The composition of claim 20, wherein the aluminum oxide comprises a plurality of filler types.

22. The composition of claim 21, wherein the plurality of filler types have an average particle size different from one another.

23. The composition of claim 21, wherein the plurality of filler types have a morphology different from one another.

24. The composition of claim 20, wherein the aluminum oxide and the boron nitride each comprise the plurality of filler type.

25. The composition of claim 1 further comprising (i) an organopolysiloxane comprising at least one alkenyl functional group; and/or (ii) an organopolysiloxane comprising at least one Si—H group.

26. The composition of claim 1 comprising an addition catalyst, a condensation curing catalyst, an inhibitor, an adhesion promoter, a crosslinker, a diluent, a thermal stabilizer, or a combination of two or more thereof.

27. The composition of claim 1 in the form of a thermal grease, adhesive, thermal gel, potting material, or a gap filler material.

28. An article comprising the composition of claim 1 disposed on at least a portion of a surface of the article.

29. The article of claim 28, wherein the article comprises multiple layers, and the composition is disposed on a surface in between at least two of the layers.

30. The article of claim 28, wherein the article is an electronic article, an automotive article, a home appliance article, smart appliance article, a telecommunication article, a healthcare article, a personal care article, an agricultural article, a molded article, a masonry surface, a textile material, a home care material.

31. The article of claim 28, wherein the article comprises light emitting devices, computer devices, a stacked die, mobile phones, tablets, flip chip package, hybrid memory cube, touch screens, Wi-Fi device, automotive technology hifi systems, a through-silicon via device, and audio systems, in joints between heat pipes and water tanks in solar heated heating, in fuel cells and wind turbines, in the manufacture of computer chips, gaming consoles, data transfer devices, in light devices, batteries, in housings, coolers, heat exchanging devices, wires, cables, heating wires, refrigerators, dishwashers, air conditionings, accumulators, transformers, lasers, functional clothing, car seats, medical devices, fire protection, electric motors, planes, and trains, as a filament for 3D printing material, drug delivery systems, transdermal patches, wound healing patches, wound dressing patches, patches for scar reduction, transdermal iontophoresis, scaffold for tissue engineering, anti-microbial devices, wound management devices, ophthalmic devices, bioinserts, prostheses, body implants, paint, structural coating, masonry coating, or marine coating, seed coating, superspreader or controlled release fertilizer.

32. A method of preparing an article comprising dispensing under pressure or stencil printing or screen printing or jet printing or 3D printing the composition of claim 1 on at least a portion of a surface of the article.

33. The method of preparing the article of claim 32 wherein a thickness of the composition is from 0.01 mm to 15 cm.

34. A personal care product comprising the composition of claim 1.

35. The personal care product of claim 34 in the form of an antiperspirant/deodorant, a shaving product, a skin lotion, a moisturizer, a toner, a bath product, a cleansing product, a shampoo, a conditioner, a combined shampoo/conditioner, a mousse, a styling gel, a hair spray, a hair dye, a hair color product, a hair bleach, a waving product, a hair straightener, a nail polish, a nail polish remover, a nail cream or lotions, a cuticle softener, a sunscreen, an insect repellent, an anti-aging product, a lipstick, a foundation, a face powder, an eye liner, an eye shadow, a blush, a makeup, a mascara, a moisturizing preparation, a foundation, a body and hand preparation, a skin care preparation, a face and neck preparation, a tonic, a dressing, a hair grooming aid, an aerosol fixative, a fragrance preparation, an aftershave, a make-up preparation, a soft focus application, a night and day skin care preparation, a non-coloring hair preparation, a tanning preparation, a synthetic and non-synthetic soap bar, a hand liquid, a nose strip, a non-woven application for personal care, a baby lotion, a baby shampoo, a baby conditioner, a shaving preparation, a cucumber slice, a skin pad, a make-up remover, a facial cleansing product, a cold cream, a sunscreen product, a spritzer, a paste mask and mud, a face mask, a cologne and toilet water, a hair cuticle coat, a shower gel, a face and body wash, a personal care rinse-off products, a gel, a foam bath, a scrubbing cleanser, an astringent, a nail conditioner, an eye shadow stick, a powder for face or eye, a lip balm, a lip gloss, a hair care pump spray, a hair-frizz-control gel, a hair leave-in conditioner, a hair pomade, a hair de-tangling product, a hair fixative, a hair bleach product, a skin lotion, a pre-shave and pre-electric shave, an anhydrous cream and lotion, an oil/water emulsion, a water/oil emulsion, a water-resistant cream or lotion, an anti-acne preparation, a mouth-wash, a massage oil, a toothpaste, a clear gel or stick, an ointment base, a topical wound-healing product, an aerosol talc, a barrier spray, a vitamin and anti-aging preparation, an herbal-extract preparation, a bath salt, a bath and body milk, a hair styling aid, a hair-, eye-, nail- and skin-soft solid application, a controlled-release personal care product, a hair conditioning mist, a skin care moisturizing mist, a skin wipe, a pore skin wipe, a pore cleaner, a blemish reducer, a skin exfoliator, a skin desquamation enhancer, a skin towelette or cloth, a depilatory preparation, or a personal care lubricant.

\* \* \* \* \*